United States Patent
Lee

(10) Patent No.: US 7,680,504 B2
(45) Date of Patent: Mar. 16, 2010

(54) MESSAGE TRANSMISSION AND RECEIVED MESSAGE ACTIVATION METHODS AND MOBILE COMMUNICATION TERMINAL HAVING MESSAGE TRANSMISSION AND RECEIVED MESSAGE ACTIVATION FUNCTIONS

(75) Inventor: Min Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 870 days.

(21) Appl. No.: 11/506,863

(22) Filed: Aug. 21, 2006

(65) Prior Publication Data

US 2007/0049303 A1    Mar. 1, 2007

(30) Foreign Application Priority Data

Aug. 24, 2005    (KR)    ............. 10-2005-0077837

(51) Int. Cl.
*H04W 4/00*    (2009.01)
(52) U.S. Cl. .................................. 455/466
(58) Field of Classification Search .......... 455/92, 455/522, 130, 466, 412.2, 413, 417, 421, 455/450; 709/216, 217
See application file for complete search history.

(56) References Cited

U.S. PATENT DOCUMENTS

| | | | |
|---|---|---|---|
| 7,366,524 B2* | 4/2008 | Watanabe et al. | 455/458 |
| 2002/0198003 A1 | 12/2002 | Klapman | |
| 2005/0221876 A1 | 10/2005 | Van Bosch et al. | |
| 2009/0146808 A1* | 6/2009 | Hovden | 340/568.1 |
| 2009/0307660 A1* | 12/2009 | Srinivasan | 717/114 |

FOREIGN PATENT DOCUMENTS

| WO | WO-99/51048 A1 | 10/1999 |
|---|---|---|
| WO | WO-03/073776 A1 | 9/2003 |

OTHER PUBLICATIONS

European Search Report dated Dec. 1, 2006.

* cited by examiner

*Primary Examiner*—Diane Mizrahi
(74) *Attorney, Agent, or Firm*—Birch, Stewart, Kolasch & Birch, LLP

(57) ABSTRACT

A method for transmitting a message including inputting, at a transmitting terminal, a message body and an activation condition indicating when the message body is to be activated on a receiving terminal, and transmitting message data to the receiving terminal. The message data includes the message body and the activation condition. Further, the activation condition is compared to a current status of the receiving terminal to determine when the message body is to be activated.

7 Claims, 4 Drawing Sheets

MESSAGE TRANSMISSION AND RECEIVED MESSAGE ACTIVATION METHODS AND MOBILE COMMUNICATION TERMINAL HAVING MESSAGE TRANSMISSION AND RECEIVED MESSAGE ACTIVATION FUNCTIONS

This application claims priority to Korean Patent Application No. 10-2005-0077837, filed on Aug. 24, 2005, which is hereby incorporated by reference in its entirety.

BACKGROUND OF THE INVENTION

1. Field of the Invention

The present invention relates to transmission and reception of a message using a mobile communication terminal.

2. Discussion of the Related Art

Short Message Service (SMS) is a text messaging service that allows mobile phone users to exchange short messages (about 40 words). As mobile terminals have become more and more common, text messaging has also become more common. Further, contrary to emails, SMS messages reach their destinations almost at the same time as when they are sent.

In more detail, SMS provides a service to exchange messages and callback numbers between terminals. Also, through SMS, users can receive weather forecasts, news, stock information, etc., and can also search a variety of information.

Further, SMS provides information in an interactive manner. Thus, not only teenagers but also middle-aged and elderly people, who may not be familiar with searching for and using information, are increasingly using the service. The SMS has also been extended to electronic payments and transactions. For example, in Korea, credit card companies introduced a service to send an SMS message carrying transaction approval information to prevent unauthorized credit card use.

On the other hand, Multimedia Messaging Service (MMS) has been introduced to overcome some disadvantages of SMS. In more detail, MMS is a third-generation mobile communication service that allows users to exchange data in various formats such as still image, music, audio, and moving image formats. Thus, MMS provides not only messages in the conventional format but also messages in multimedia format. MMS systems also allow users to exchange messages without any real-time transmission request.

That is, when the sender sends a message using the conventional messaging service, the recipient receives the message in almost real time. Thus, the recipient can immediately check the message. Meanwhile, a programmed messaging service has been introduced. In this service, a sender creates a message to be sent using the programmed messaging service, and the message is first stored in a network server and thereafter sent to the recipient at a preset time.

However, the "programmed messaging service" simply sends a message at the preset time and thus does not allow a user to send and receive interesting messages together with image data having a special visual effect on a specific anniversary or at a time set by the user.

SUMMARY OF THE INVENTION

Accordingly, one object of the present invention is to address the above-noted and other objects.

Another object of the present invention is to allow transmitting and receiving terminals to actively handle a programmed messaging function so that a received message can be checked at a specific time.

Yet another object of the present invention is to perform the programmed messaging function such that a text message is displayed together with an image instead of displaying the simple text message alone.

To achieve these objects and other advantages and in accordance with the purpose of the invention, as embodied and broadly described herein, the present invention provides a method for transmitting a message including inputting, at a transmitting terminal, a message body and an activation condition indicating when the message body is to be activated on a receiving terminal, and transmitting message data to the receiving terminal in which the message data includes the message body and the activation condition. Further, the activation condition is compared to a current status of the receiving terminal to determine when the message body is to be activated.

In another aspect, the present invention provides a method for receiving a message including receiving, at a receiving terminal, message data including a message body and an activation condition indicating when the message body is to be activated, comparing the activation condition with a current status of the receiving terminal, and activating the message body when the comparing step determines the activation condition coincides with the current status of the receiving terminal. The present invention also provides a corresponding receiving and transmitting mobile communication terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The following are definitions of terms used in the present invention.

1) The term "dormant message" refers to a message, the body of which cannot be checked at the receiving terminal until an activation condition is reached even if the receiving terminal has received the message.

2) The activation condition corresponds to a physical location of the receiving terminal or an activation time set by a user of the transmitting terminal. Further, the activation condition is independent of an action by a user of the receiving terminal.

3) The term "activation time" refers to the time which the sender sets to a message and at which the message is to be activated at the receiving terminal so that the body of the message can read or checked.

4) The term "physical location" refers a location of the receiving terminal. For example, the location can be GPS coordinates corresponding to a particular restaurant, store, or locations such as the Grand Canyon, etc. or any other location. Thus, the sender can set the activation condition to be the Grand Canyon and when the user of the receiving terminal is at the Grand Canyon, the message body is activated.

4) The term "activation image" refers to an image that is displayed together with the body of a dormant message when the dormant message is active and that also can be displayed independently of the body of the dormant message when the dormant message is inactive. Thus, the transmitting terminal transmits the activation image together with the body of the dormant message or transmits an indicator of the activation image together with the body of the dormant message. The indicator indicates an activation image stored on the receiving terminal or may be a URL of at least one image stored on a server. For example, the indicator may be a code value indicating an image filed stored on the receiving terminal. Thus, rather than transmitting the image file itself, the code value may be transmitted (i.e., the code value indicates a location of the stored image file on the receiving terminal and is thus much smaller in size than the image file itself). Music or sound files may also be played together with the displayed image(s).

Figure 1:
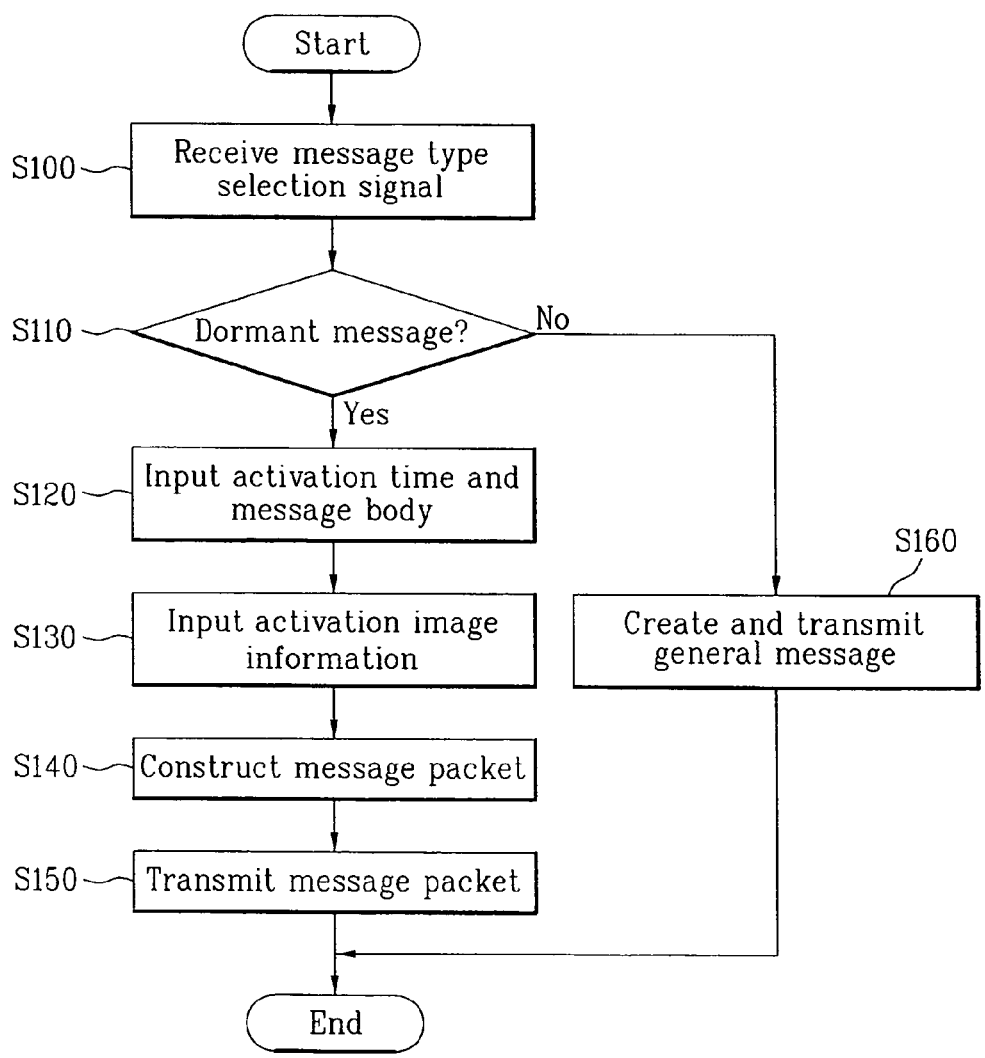
FIG. 1 is a flowchart of a method for transmitting a message using a terminal according to an embodiment of the present invention.

Turning now to FIG. 1, which is a flowchart of a method for transmitting a message using a terminal according to an embodiment of the present invention. Note, the transmitting terminal can be a mobile telephone, a Personal Digital Assistant (PDA), a laptop computer, a desktop computer, etc.

As shown, a transmitting terminal receives a signal for selecting a message type from a user (S100). For example, one of the message types is a dormant message type. In addition, the user can select one of the plurality of message types through a menu and interface provided by the terminal.

Then, the transmitting terminal determines whether or not the message type selected by the user is a dormant message type (S110). If the selected message is not a dormant message (No in S110), a message is created and sent as a regular non-dormant message (S160).

If the terminal determines the selected message is a dormant message (Yes in S110), the user of the transmitting terminal inputs a message body and an activation condition (S120). The activation condition indicates when the message body is to be activated at the receiving terminal. That is, the activation condition, after which the recipient can view the message body, can be selected by the sender. As discussed above, the activation condition can be a time, a location, etc. That is, the activation condition is independent of an action by the user of the receiving terminal.

Further, as shown in FIG. 1, the user can input other information such as an activation image to be displayed on the receiving terminal (S130). The activation image may be stored on the transmitting terminal or may be stored on the receiving terminal or an external server. To specify an image stored on the receiving terminal, information about the image is shared between the transmitting and receiving terminals. For example, the same image(s), and module or software for implementing the present invention may be installed on the transmitting and receiving terminals. Music or sound files may also be played together with the displayed image(s).

In addition, the information about the activation image input in step S130 may indicate that one image be displayed immediately before the message body is activated at the receiving terminal. Alternatively, the user may select two or more images to be sequentially displayed before the message body is activated at the receiving terminal. The image(s) may also be displayed after the message body has been activated or when the message body is activated.

The activation image information may also include information about images having a gradually changing shape. For example, a collection of images may be selected that expresses a process in which a seed grows to flower, an emotion of a specific person changing, or a change of seasons (spring, summer, autumn and winter).

The image information may also include information of a variety of photo images input by the user or information such as animations and cartoons. The activation image information may also include video information such as a moving image composed of a plurality of still images, or Flash images.

Returning to FIG. 1, after the user inputs the activation image information, the terminal creates a message packet including the selected message type, the input activation condition and the message body (S140). The term "packet" in the present invention refers to a message carrying structure and is not limited to the meaning of the term "packet" used in a packet switching communication network.

In addition, if the user inputs activation image information, the message packet also includes the activation image information. That is, the message packet transmitted according to the present invention may or may not include image information. Further, the message packet may include a specific image (or images) or may include an indicator indicating an image stored on the receiving terminal or on a server, for example.

Thus, when an image is included in the message packet, the user can view the message body together with the image when the activation time is reached. When no image is included in the message packet, an image on the receiving terminal can be displayed in various manners before the activation condition (e.g., to notify the receiving user about the received dormant message).

Preferably, a header of the message packet includes the message type and the activation condition. Then, the message body and the activation image may be included in a payload of the message packet. However, the present invention is not limited to this message packet structure.

Then, the constructed message packet is transmitted (S150). Although the message packet is generally transmitted over a wireless communication network, the present invention is not limited to such transmission. In addition, the receiving terminal can also notify the receiving user about whether or not a dormant message has been received. However, the sender can override this feature and transmit the dormant message such that the recipient is not notified about the dormant message before the activation time.

Figure 2:
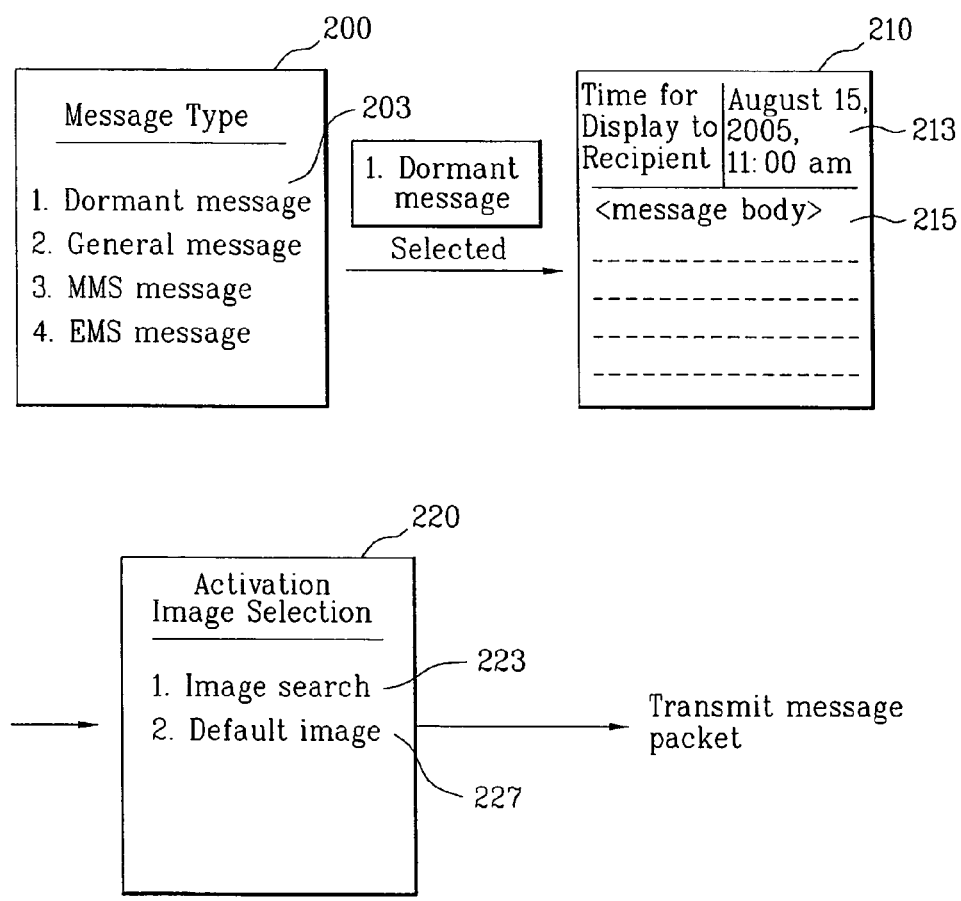
FIG. 2 is an overview illustrating example screens for transmitting a dormant message according to an embodiment of the present invention.

Turning next to FIG. 2, which is an overview illustrating example screens for transmitting a dormant message according to an embodiment of the present invention. As shown, a message selection screen 200 allows the user to select the type of a message to be created and transmitted. For example, the message selection screen 200 includes a dormant message option 203.

Thus, once the user selects the dormant message option 203, the user can enter an activation condition 213 (which is a particular time in this example) and a message body 215 on a message creation screen 210. Thereafter, the user can optionally select an image search option 223 to select a stored image on an activation image selection screen 220. The user can also select a default image option 227 to transmit only an indicator of an image to be displayed on the receiving terminal as described above.

Figure 3:
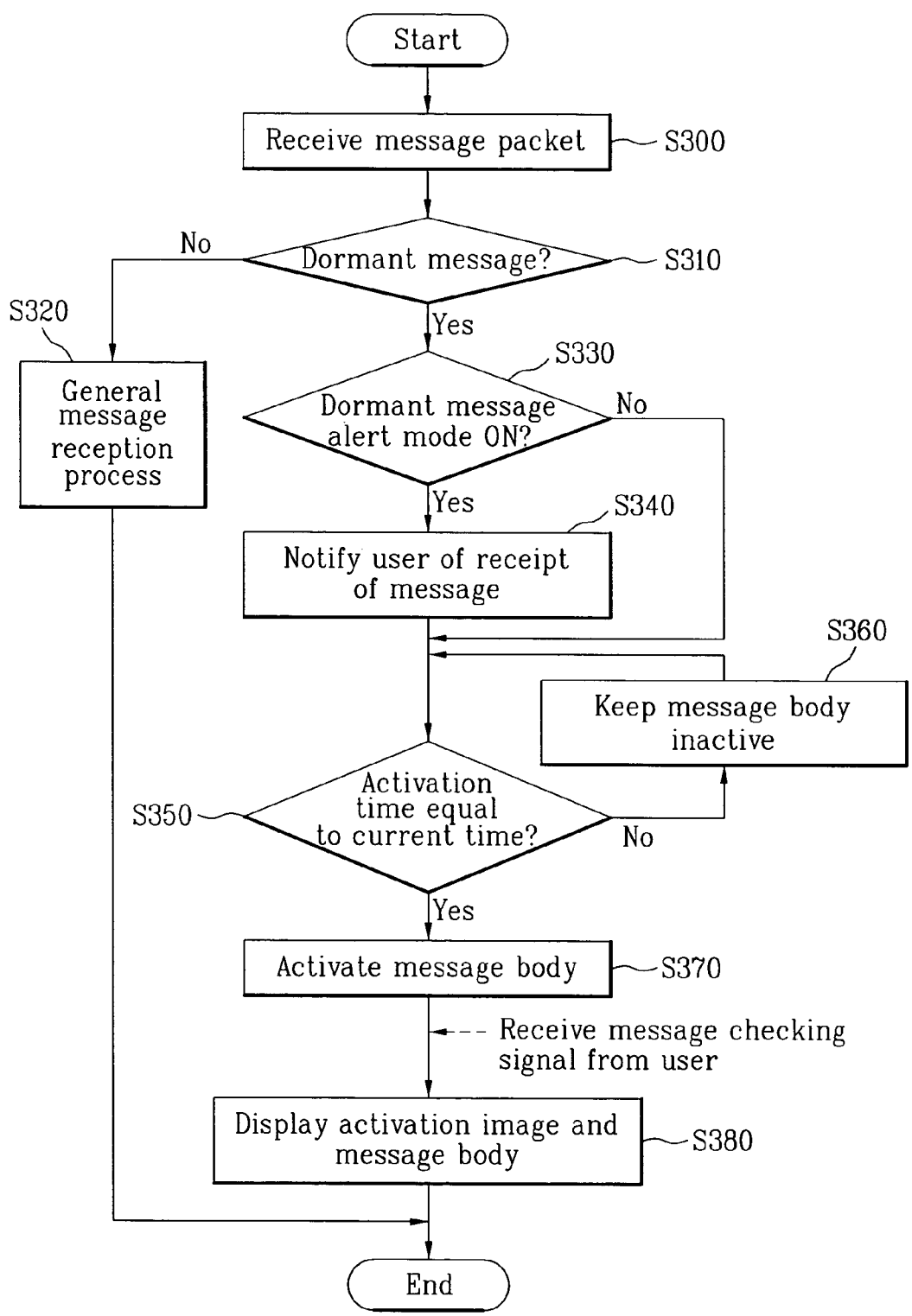
FIG. 3 is a flowchart of a method for activating a received message using a terminal according to an embodiment of the present invention.

Next, FIG. 3 is a flowchart of a method for activating a received message using a receiving terminal according to an embodiment of the present invention. As shown, the receiving terminal receives a message packet (S300), which as discussed above may be a general message or a dormant message. The message packet may also include message type information, an activation condition and a message body.

The receiving terminal then parses the received message packet to determine whether or not the received message type is a dormant message type (S310). If the received message is not a dormant message (No in S310), the receiving terminal performs a general message reception process (S320).

However, if the received message is a dormant message (Yes in S310), the receiving terminal determines whether or not a dormant message alert mode is on (S330). If the alert mode is off (No in S330), the receiving terminal stores the received dormant message and proceeds to the next step S350 without notifying the user that the dormant message has been received. On the other hand, if the alert mode is on (Yes in S330), the receiving terminal notifies the user that the dormant message has been received (S340).

In addition, the user may be notified that the dormant message has been received in a variety of ways. For example, the user may be notified via an alarm, a displayed image alone or together with a sound, by vibrating the phone, by displaying a notification indicator, etc.

The receiving terminal then determines whether or not the activation condition included in the message packet is equal to the current status of the receiving terminal (S350). If the current status does not coincide with the activation condition (No in S350), the receiving terminal repeats the above step S350 at regular intervals while keeping the received message body inactive (S360).

However, if the activation condition does coincide with the current status (Yes in S350), the message body is activated (S370). In addition, the receiving terminal preferably notifies the user that the message has been activated so that the user can check the received message. Thereafter, upon receiving a signal for checking the received dormant message from the user, the receiving terminal displays the message body included in the message (S380).

In addition, as discussed above, activation image information may be included in the received message packet. Thus, when the message includes activation image information, the activation image is displayed together with the body of the message. In addition, the activation image can also be displayed earlier than the message body to notify the user about the received message.

When the activation image information indicates a collection of images, the receiving terminal may sequentially display the images before the activation time (i.e., even when the message body is inactive) while displaying the time remaining until the activation time. However, when the dormant message alert mode is off, the images are not displayed.

Further, the transmitting terminal can also transmit a message packet including audio information other than the activation image information. The receiving terminal then outputs the audio information through a similar process as the activation image. For example, the receiving terminal can output the audio information when the dormant message is activated at the receiving terminal. The audio information included in the message packet may include audio data encoded according to a specific scheme and may also include an indicator of specific audio data stored in the receiving terminal. The audio information may also be played together with the activation image(s).

Figure 4:
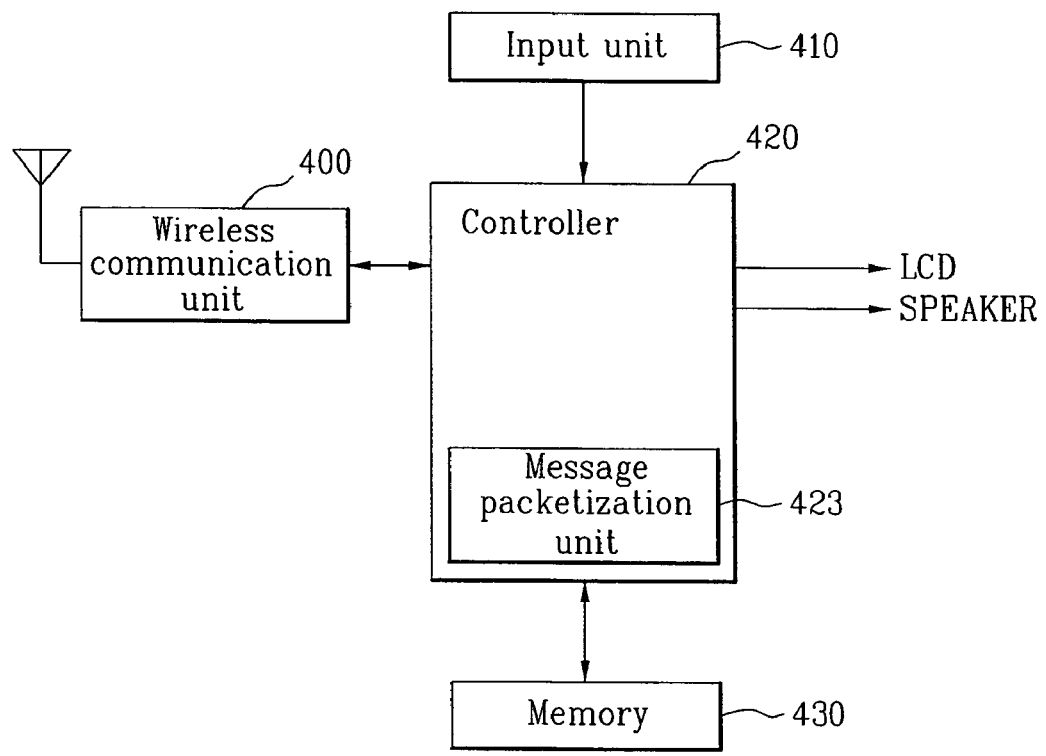
FIG. 4 is a block diagram of a terminal having a message transmission function and a received message activation function according to an embodiment of the present invention.

Next, FIG. 4 is a block diagram of a mobile communication terminal having a message transmission and reception function according to an embodiment of the present invention. As shown, the mobile terminal includes a wireless communication unit 400, an input unit 410, a controller 420, and a memory 430. A GPS unit is also included to determine the physical location of the terminal.

Further, the controller 420 includes a message packetization unit 423 and the communication unit 400 performs data communication over a mobile communication network. Also, the input unit 410 is an interface device such as a keypad or a touch screen that receives a variety of signals from the user. The controller 420 controls the overall operation of the mobile terminal.

In addition, the memory 430 stores a program for controlling the overall operation of the mobile communication terminal and stores a variety of data related to the overall operation of the mobile. The memory 430 also stores activation image information.

When the terminal is a transmitting terminal and the selected message type is a dormant message type, the user inputs on the input unit 410 a message body and an activation condition indicating when the message body is to be activated at the receiving terminal. The user may also input activation image information for displaying an image or images on the receiving terminal.

In addition, the message packetization unit 423 constructs a message packet including the selected message type, input activation condition and message body. When the user also inputs activation image information, the message packetization unit 423 constructs the message packet by additionally incorporating the activation image information into the message packet. Then, the wireless communication unit 400 transmits the constructed message packet over the mobile communication network.

When the terminal shown in FIG. 4 is a receiving terminal, the wireless communication unit 400 receives the message packet including a message type, an activation condition and a message body over the mobile communication network. The controller 420 then parses the received message packet to determine whether or not the message type is a dormant message type. If the received message is a dormant message, the controller 420 compares the activation condition included in the message with the current condition to determine whether to activate the message body.

In addition, the controller 420 may also output a first control signal to maintain the message body inactive until the current condition is equal to the activation condition and that activates the message body. The controller 420 may also output a second control signal to notify the user that the received message body can be checked if the activation condition is equal to the current condition. The controller 420 may additionally output a third control signal to display the message body when a signal for checking the message body has been received from the input unit 410.

Further, the controller 420 may output a fourth control signal to display an activation image before displaying the message body if the received message packet includes information of the activation image. However, when the activation image information included in the message packet is not an image but an indicator of a specific activation image, the controller 420 reads and displays the activation image stored in the memory 430 of the receiving terminal. As discussed above, the activation image information may also be a URL.

In addition, the controller 420 may also output a fifth control signal to notify the user that the message has been received if the received message is a dormant message and a dormant message alert mode is previously set on by the user. The user can set the dormant message alert mode using the input unit 410.

Further, when the message body is inactive, the controller 420 may output a sixth control signal to display an activation image gradually changing as time passes (or to sequentially display activation images as time passes) while displaying a time remaining until the activation time.

In addition, the transmitting user may also input a particular day such as a Birthday, Christmas, anniversary, etc. corresponding to the activation condition. The message body may also be a text message or a voice message. Further, the user may input only image information such that just an image is displayed at the activation condition, rather than the image being displayed together with the message body. That is, the user can skip entering a message body and only enter image information.

Thus, according to the present invention, transmitting and receiving terminals can actively handle a programmed messaging function so a received message can be checked at a specific condition. In addition, the programmed messaging function is performed such that a text message is displayed together with an image instead of displaying the simple text message alone, thereby satisfying various demands of users.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a message, the method comprising:
    inputting, at a transmitting terminal, a message body of a Short Message Service (SMS) message or a Multimedia Messaging Service (MMS) message and an activation condition indicating when the message body is to be activated on a receiving terminal;
    transmitting message data to the receiving terminal, said message data including the message body and the activation condition; and
    selecting a dormant message type among a plurality of message types, said dormant message type indicating the message body is to be activated on the receiving terminal according to the activation condition,
    wherein the message data further includes the selected dormant message type,
    wherein the activation condition is compared to a current status of the receiving terminal to determine when the message body is to be activated, and
    wherein the activation condition corresponds to at least one of a physical location of the receiving terminal and an activation time set by a user of the transmitting terminal.

2. The method according to claim 1, wherein the activation condition is independent of an action by a user of the receiving terminal.

3. The method according to claim 1, wherein the transmitting terminal comprises a mobile phone or a computer, and the message body comprises a voice message or a text message.

4. The method according to claim 1, further comprising:
    inputting image information corresponding to at least one image to be displayed on the receiving terminal before the message body is to be activated or when the message body is to be activated.

5. The method according to claim 4, wherein the image information is a URL of at least one image stored on a server, a code value indicating at least one image stored on the receiving terminal or an image file to be transmitted to the receiving terminal.

6. The method according to claim 4, wherein the at least one image is associated with a collection of images that display a changing image when sequentially displayed.

7. A transmitting terminal, comprising:
    an inputting unit configured to input a message body of a Short Message Service (SMS) message or a Multimedia Messaging Service (MMS) message and an activation condition indicating when the message body is to be activated on a receiving terminal, and to receive a selecting selection signal indicating a selection of a dormant message type among a plurality of message types, said dormant message type indicating the message body is to be activated on the receiving terminal according to the activation condition, wherein the message data further includes the selected dormant message type; and
    a transmitting unit configured to transmit message data to the receiving terminal, said message data including the message body and the activation condition,
    wherein the activation condition is compared to a current status of the receiving terminal to determine when the message body is to be activated, and
    wherein the activation condition corresponds to at least one of a physical location of the receiving terminal and an activation time set by a user of the transmitting terminal.

* * * * *